G. B. ELY.
MANUFACTURE OF HAY AND OTHER FORKS.
No. 69,196. Patented Sept. 24, 1867.
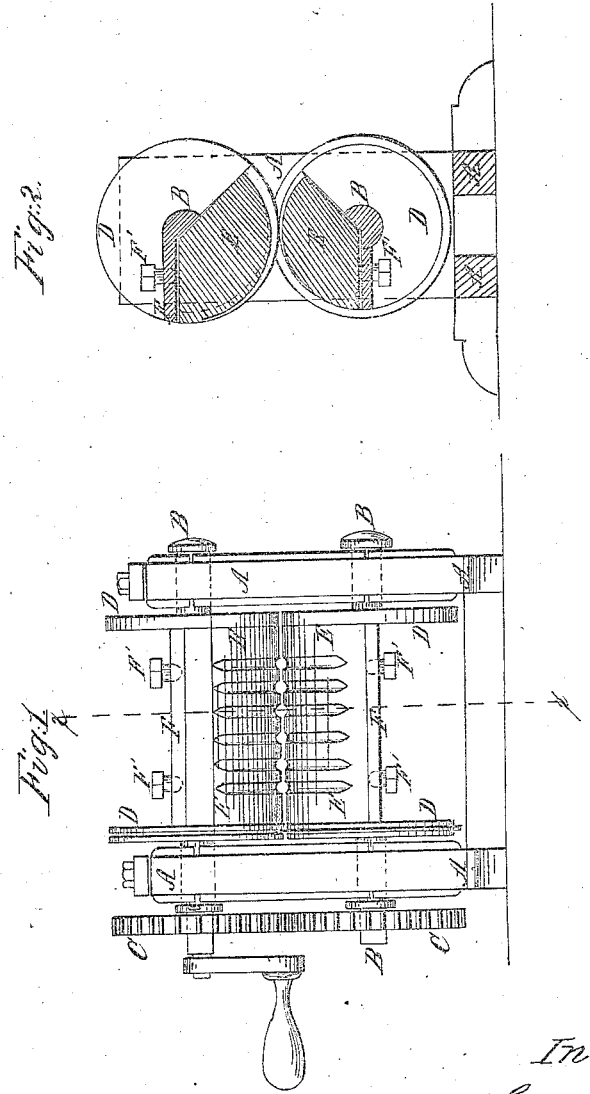
Witnesses.
Theo. Tuscke
J. A. Service
Inventor.
George B. Ely
Per Munn &Co
Attorney

United States Patent Office.

GEORGE B. ELY, OF ST. JOHNSBURY, VERMONT.

Letters Patent No. 69,196, dated September 24, 1867.

IMPROVEMENT IN MANUFACTURE OF HAY AND OTHER FORKS.

*The Schedule referred to in these Letters Patent and making part of the same.*

TO ALL WHOM IT MAY CONCERN:

Be it known that I, GEORGE B. ELY, of St. Johnsbury, in the county of Caledonia, and State of Vermont, have invented a new and useful Improvement in Manufacturing Hay-Forks, Manure-Forks, &c.; and I do hereby declare that the following is a full, clear, and exact description thereof, which will enable others skilled in the art to make and use the same, reference being had to the accompanying drawings, forming part of this specification, in which—

Figure 1 is a front view of my improved machine.

Figure 2 is a vertical cross-section of the same.

Similar letters of reference indicate like parts.

My invention has for its object to furnish an improved machine, by means of which the proper form may be given to hay and manure-fork tines, by drawing them out by the action of rolls having grooves of the necessary shape formed in them; and it consists in the semi-cylindrical dies having grooves of the necessary shape and size to give the proper shape to the fork-tines, in combination with each other and with shafts and gearing, by means of which the said dies are operated.

A is the frame of the machine, in which are formed the bearings for the shafts B. To the journals of the shafts B are attached gear-wheels C, of exactly the same size, so that motion may be communicated from the one shaft to the other, and so that the two shafts may be revolved with exactly the same velocity. D are wheels, attached to or formed upon the shafts B within the frame A, the edges of which roll upon each other, as shown in figs. 1 and 2. The face of one or both the wheels upon the one shaft may be grooved, and the face of the corresponding wheel or wheels upon the other shaft may have a tongue formed upon it entering and working in the said grooves, so as to act as guides to keep the dies in proper operating position. E are dies, securely attached to or formed upon the shafts B and wheels D. The dies E are made in the form of a portion of a cylinder, as shown in the drawings. I prefer to make them in about the form of half cylinders, though a little variation from that form in either direction is immaterial. F is a plate, extending from the shafts B to the circumference of the wheels D, and securely attached to or formed solid with the said shafts and wheels. The dies E rest against the plates F, and are held forward to their work by the set-screws G, which pass through the said plates, and have their ends resting against the said dies, as shown in figs. 1 and 2. Upon the circular faces of the dies E are formed grooves for drawing the tines down to the desired size and taper, and to give them the desired shape. I generally prefer to make them with six grooves, four V-shaped, to draw the tines to the proper size and taper, and two half round or oval, to give that form to the tines when desired. The exact form of the grooves will depend upon the character of the forks the tines of which are to be drawn.

I claim as new, and desire to secure by Letters Patent—

1. The combination of the dies E, wheels D, shafts B, plates F, all constructed and arranged substantially as described and for the purpose specified.

2. The dies E, shaft B, having plate F and set-screws G, wheels D, with the groove and tongue, gear-wheels C, and standards A, all constructed and arranged as described, whereby hay and manure-fork tines are drawn and bent, substantially as described for the purpose specified.

GEORGE B. ELY.

Witnesses:
 JONATHAN ROSS,
 EMERSON HALL.